United States Patent
Kamasuka

(10) Patent No.: US 7,903,270 B2
(45) Date of Patent: Mar. 8, 2011

(54) IMAGE PROCESSING APPARATUS FOR DETECTING WHETHER A SCANNED DOCUMENT IS AN ORIGINAL PAPER, AND CONTROL METHOD AND PROGRAM FOR SUCH AN APPARATUS

(75) Inventor: Atsushi Kamasuka, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 11/849,668

(22) Filed: Sep. 4, 2007

(65) Prior Publication Data

US 2008/0056545 A1 Mar. 6, 2008

(30) Foreign Application Priority Data

Sep. 5, 2006 (JP) ................................. 2006-240195
Dec. 13, 2006 (JP) ................................. 2006-336034

(51) Int. Cl.
*G06K 15/00* (2006.01)
(52) U.S. Cl. ........ 358/1.14; 340/5.86; 235/454; 382/209
(58) Field of Classification Search ................. 358/1.14; 340/5.86; 356/71; 382/115, 100
See application file for complete search history.

(56) References Cited

U.S. PATENT DOCUMENTS

| | | | | |
|---|---|---|---|---|
| 4,423,415 A | * | 12/1983 | Goldman | 340/5.86 |
| 5,673,338 A | * | 9/1997 | Denenberg et al. | 382/209 |
| 7,155,365 B1 | * | 12/2006 | Gross et al. | 702/179 |
| 7,162,393 B1 | * | 1/2007 | Vacar et al. | 702/183 |
| 2005/0099330 A1 | * | 5/2005 | Hausner et al. | 342/22 |
| 2005/0105044 A1 | * | 5/2005 | Warden et al. | 351/159 |
| 2006/0233455 A1 | * | 10/2006 | Cheng et al. | 382/274 |

FOREIGN PATENT DOCUMENTS

| | | |
|---|---|---|
| JP | 2004-102562 | 4/2004 |
| JP | 2004-112608 | 4/2004 |
| JP | 2006-020217 | 1/2006 |

* cited by examiner

*Primary Examiner* — King Y Poon
*Assistant Examiner* — David S Cammack
(74) *Attorney, Agent, or Firm* — Fitzpatrick, Cella, Harper & Scinto

(57) ABSTRACT

The present invention provides to output, in a shortest possible time, a comparison result of a "dactylogram of paper" in a system for assuring being original paper of a "dactylogram of paper", with accuracy. A scanned image data of a paper document is obtained, while pre-stored dactylogram data for the paper is acquired. Between two image data of n-th region cut out from the scanned data and the stored image data respectively, the degree of similarity is calculated If the degree for a first region is a value C1 or more, it is determined that the both side matches. If the degree is less than a value C2 that is smaller than the C1, the both side are determined to mismatch each other. If the degree is less than the C1 and is the C2 or more, then comparison for a second region performed to determine whether matching or not.

3 Claims, 15 Drawing Sheets

IMAGE PROCESSING APPARATUS FOR DETECTING WHETHER A SCANNED DOCUMENT IS AN ORIGINAL PAPER, AND CONTROL METHOD AND PROGRAM FOR SUCH AN APPARATUS

BACKGROUND OF THE INVENTION

1. Field of the Invention

The present invention relates to an image processing apparatus that can handle feature information specific to a paper sheet of an individual paper document on which letters are printed (hereinafter, such feature information also referred to as a dactylogram of paper or a paper dactylogram), an image processing method, a program for the image processing method and its storage medium.

2. Description of the Related Art

In view of the rapid progress of document computerization in recent years, a technique is desired to appropriately determine the authenticity (true or false) of a paper document in order to ascertain that various types of documents issued by outputting on paper are original paper or are authenticated.

Generally, as means for preventing counterfeiting of documentation, there is known a method of printing an identification code on the documentation itself and, on this occasion, using an advanced printing technique to make counterfeiting difficult or using unavailable special ink to print the identification code. A method is also known of bonding to documentation a counterfeiting prevention sheet formed by a special technique such as holography. The method of using special paper or a special printing technique has a problem of inconvenience and high cost due to using a printing medium which is not widely-distributed. Nowadays, there is proposed a technique of using non-reproducible random patterns on a paper surface for identification (for example, see Japanese Patent Laid-Open No. 2004-102562, hereinafter referred to as the reference 1). According to the technique disclosed in the reference 1, the unique state information produced by a paper manufacturing process, for example, a fiber pattern of fibers forming the paper or a lack of uniformity of thickness, is scanned and the scanned image data is stored in advance, then the state information is compared to state information obtained from the same place on a tested paper. The degree of matching is calculated in the comparison, enabling confirming of whether or not the tested paper is the original paper.

The dactylogram of paper disclosed in the reference 1 is very susceptible to folds or wrinkles of a printing medium. Therefore, the reference 1 discloses as follows in its paragraph 0094: "Paper would be susceptible to fold or wrinkle due to secular changes, state of preservation or a usage state. Because of this, an observation region of tested paper registered by the above registration processing would not be possibly read out in the same manner at the registration. To address such a case, means for specifying observation regions over a plurality of places on the tested paper is valid. Particularly, for example as shown in FIG. 17, five places is selected in a particular range (a rectangular region as shown in the drawing herein) including points Q1 to Q5 on a paper surface of tested paper 414, the five places are specified as observation regions S1 to S5. In this case, robustness is improved by employing an approach of giving priorities to the respective observation regions S1 to S5 and to compare/determine them in order as necessary."

That is, the reference describes that comparison/determining of a sheet is more precise by registering a plurality of paper dactylograms rather than registering a single paper dactylogram. In the reference, a paper dactylogram is image information, the image representing a pattern of paper fiber specific to a paper sheet of a paper document.

Particularly, if paper is not stained at all or wrinkled, a dactylogram of the paper does not change at all. Therefore, a previously registered dactylogram of the paper matches a scanned dactylogram of paper on a sheet (or the degree of similarity between them is extremely high).

Otherwise, (1) if the paper itself is replaced, or (2) if folds or wrinkles of the paper cause the dactylogram of the paper to change, the previously registered dactylogram of the paper does not match the scanned dactylogram of paper on the sheet.

In the above case, (1) if the paper itself has been replaced, then the degree of similarity is measured to be very low (for example, the kind of paper itself differs from the original paper), or the degree of similarity is measured to be a value which is not very high but not very low (for example, both fiber patterns are accidentally similar to each other).

Also, in the above case, (2) if folds or wrinkles of paper cause a change in the dactylogram of the paper, the degree of similarity is measured at value which is not very high but not very low.

That is, if the degree of similarity between previously registered image information and a scanned image information on a sheet indicates a value which is not very high but not very low, this means it cannot be determined whether the paper itself has been replaced, or the paper itself has not been replaced (but has suffered from folds or wrinkles).

Therefore, when the degree of similarity is not very high but not very low, as for guaranteeing that the paper is the original paper, there is possibility of a mistake. On the other hand, the possibility of a mistake lies in negating that the paper is the original paper. In other word, there is possibility to cause a wrong determination result.

SUMMARY OF THE INVENTION

The present invention is made in view of the above perspectives. An object of the present invention is to provide an image processing apparatus, a control method of the image processing apparatus, a program of the control method and a storage medium of the program for performing a determination (comparison) about other regions if the degree of similarity between image information (for example, paper dactylogram information) in certain regions is determined not to be very high but not to be very low (i.e., having a medium value).

According to a first embodiment of the present invention, an image processing apparatus according to the present invention acquires scanned image information of a first region and a second region on a sheet, and compares the acquired image information of the first region and the second region to previously registered image information of the first region and the second region. The image processing apparatus comprises: first determination means for determining the degree of similarity between the acquired image information of the first region and the previously registered image information of the first region; and second determination means for determining the degree of similarity between the acquired image information of the second region and the previously registered image information of the second region, if the first determination means determines the degree of similarity is a first value or more and less than a second value.

If the determination means determines the measured degree of similarity is less than the first value, then the scanned sheet is determined not to be the original paper. If the measured degree of similarity is determined to be the second value or more, then the scanned sheet is determined to be the original paper.

According to a second embodiment of the present invention, an image processing apparatus according to the present invention determines whether or not a scanned sheet is original paper by using previously registered paper dactylogram information. The image processing apparatus comprises: first determination means for, by targeting the scanned particular region on the sheet, determining the degree of similarity between image information of the particular region and image information of a region corresponding to the particular region of the previously registered image information; and second determination means for determining whether or not the scanned sheet is original paper based on a determination result by the first determination means, wherein if the determination means determines the degree of similarity is a first value or more and less than a second value when a first region is targeted, then a second region differing from the first region is targeted to determine the degree of similarity between the scanned image information of the second region on the sheet and image information of a region corresponding to the second region of the previously registered image information.

According to the first and second embodiments of the present invention, the image information can be paper dactylogram information.

According to a third embodiment of the present invention, a image processing apparatus according to the present invention acquires scanned sheet image information of a first region and a second region on a sheet, and compares the acquired image information of the first region and the second region by using the previously registered image information of the first region and the second region. A control method of the image processing apparatus comprises: a first determination step of determining the degree of similarity between the acquired image information of the first region and the previously registered image information of the first region; and a second determination step of determining the degree of similarity between the acquired image information of the second region and the previously registered image information of the second region if the degree of similarity is determined to be a first value or more and less than a second value at the first determination step.

If the measured degree of similarity is determined to be less than the first value at the first determination step, then the scanned sheet is determined not to be original paper. If the measured degree of similarity is determined to be the second value or more, then the scanned sheet is determined to be the original paper.

According to a fourth embodiment of the present invention, a control method of an image processing apparatus according to the present invention comprises judging whether or not a scanned sheet is original paper by using previously registered paper dactylogram information. The control method of a image processing apparatus comprises: a first determination step of, by targeting a particular region on the scanned sheet, determining the degree of similarity between image information of the particular region and image information of a region corresponding to the particular region of the previously registered image information; and a second determination step of determining whether or not the scanned sheet is original paper based on a determination result at the first determination step, wherein if the degree of similarity is determined to be a first value or more and less than a second value at the first determination step when a first region is targeted, then a second region differing from the first region is targeted to determine the degree of similarity between the scanned image information of the second region on the sheet and image information of a region corresponding to the second region of the previously registered image information at the second determination step.

According to the third and fourth embodiments of the present invention, the image information can be paper dactylogram information.

According to a fifth embodiment of the present invention, a program according to the present invention acquires scanned image information of a first region and a second region on a sheet, and includes causing a computer to execute comparing of the acquired image information of the first region and the second region by using the previously registered image information of the first region and the second region. The program comprises: a first determination step of determining the degree of similarity between the acquired image information of the first region and the previously registered image information of the first region; and a second determination step of determining the degree of similarity between the acquired image information of the second region and the previously registered image information of the second region if the degree of similarity is determined to be a first value or more and less than a second value at the first determination step.

If the measured degree of similarity is determined to be less than the first value at the first determination step, then the scanned sheet is determined not to be original paper. If the measured degree of similarity is determined to be the second value or more, then the scanned sheet is determined to be the original paper.

According to a sixth embodiment of the present invention, a program according to the present invention includes causing a computer to execute determination whether or not a scanned sheet is original paper by using previously registered paper dactylogram information. The program comprises: a first determination step of, by targeting a particular region on the scanned sheet, determining the degree of similarity between image information of the particular region and image information of a region corresponding to the particular region of the previously registered image information; and a second determination step of determining whether or not the scanned sheet is original paper based on a determination result at the first determination step, wherein if the degree of similarity is determined to be a first value or more and less than a second value when a first region is targeted, then, at the second determination step, a second region differing from the first region is targeted to determine the degree of similarity between image information of the second region on the scanned sheet and image information of a region corresponding to the second region of the previously registered image information.

According to the fifth and sixth embodiments of the present invention, the image information is characterized in being paper dactylogram information.

According to a seventh embodiment of the present invention, a computer-readable recording medium recording the program according to the present invention acquires scanned image information of a first region and a second region on a sheet, and contains the program causing a computer to execute comparing the acquired image information of the first region and the second region by using the previously registered image information of the first region and the second region. The program comprises: a first determination step of determining the degree of similarity between the acquired image information of the first region and the previously registered image information of the first region; and a second determination step of determining the degree of similarity between the acquired image information of the second region and the previously registered image information of the second region if the degree of similarity is determined to be a first value or more and less than a second value at the first determination step.

According to an eighth embodiment of the present invention, a computer-readable recording medium recording the program according to the present invention contains the program causing a computer to execute determining whether or not a scanned sheet is original paper by using previously registered paper dactylogram information. The program comprises: a first determination step of, by targeting a particular region on the scanned sheet, determining the degree of similarity between image information of the particular region and image information of a region corresponding to the particular region of the previously registered image information; and second a determination step of determining whether or not the scanned sheet is original paper based on a determination result at the determination step, wherein the second determination step comprises determining the degree of similarity between image information of the second region on the scanned sheet and image information of a region corresponding to the second region of the previously registered image information by targeting the second region differing from the first region if the degree of similarity is determined to be a first value or more and less than a second value when a first region is targeted.

If the degree of similarity between image information (for example, paper dactylogram information) in certain regions is not so high but so low, the degree of similarity between image information (for example, paper dactylogram information) in other regions can be measured and determined. By take on this way, for example, excessive determination of the degree of similarity can be prevented.

Further features of the present invention will become apparent from the following description of exemplary embodiments (with reference to the attached drawings).

DESCRIPTION OF THE EMBODIMENTS

The following description will describe the best embodiment to embody the present invention with reference to the drawings.

As apparent from the above description, a system including an image processing apparatus according to the present invention comprises at least a scanner that can scan an original manuscript to obtain a paper surface image of parts other than a region having printed letters on the original manuscript (or original document) (sheet). The system further comprises a processing unit for processing a dactylogram of paper from the image scanned by the scanner, a user interface including a display and an operation button, and an external database for registering the dactylogram of paper. The image processing apparatus according to the present invention can also be an image forming apparatus including the above scanner, processing unit and user interface.

First, the system including the image processing apparatus according to the present invention will be described. Although various types of embodiments are contemplated as an image processing apparatus according to the present invention, a copier comprising a scanner unit and a printer unit what they are called will be described basically for simplicity in the description.

In this description, a dactylogram of paper is image information, meaning an image representing a paper fiber pattern specific to a paper sheet itself of a paper document or feature information associated with the image, or meaning a surface image on the paper, a transfer image or feature information associated with the images.

<Printing System in which the Present Invention is Applicable>

Figure 1:
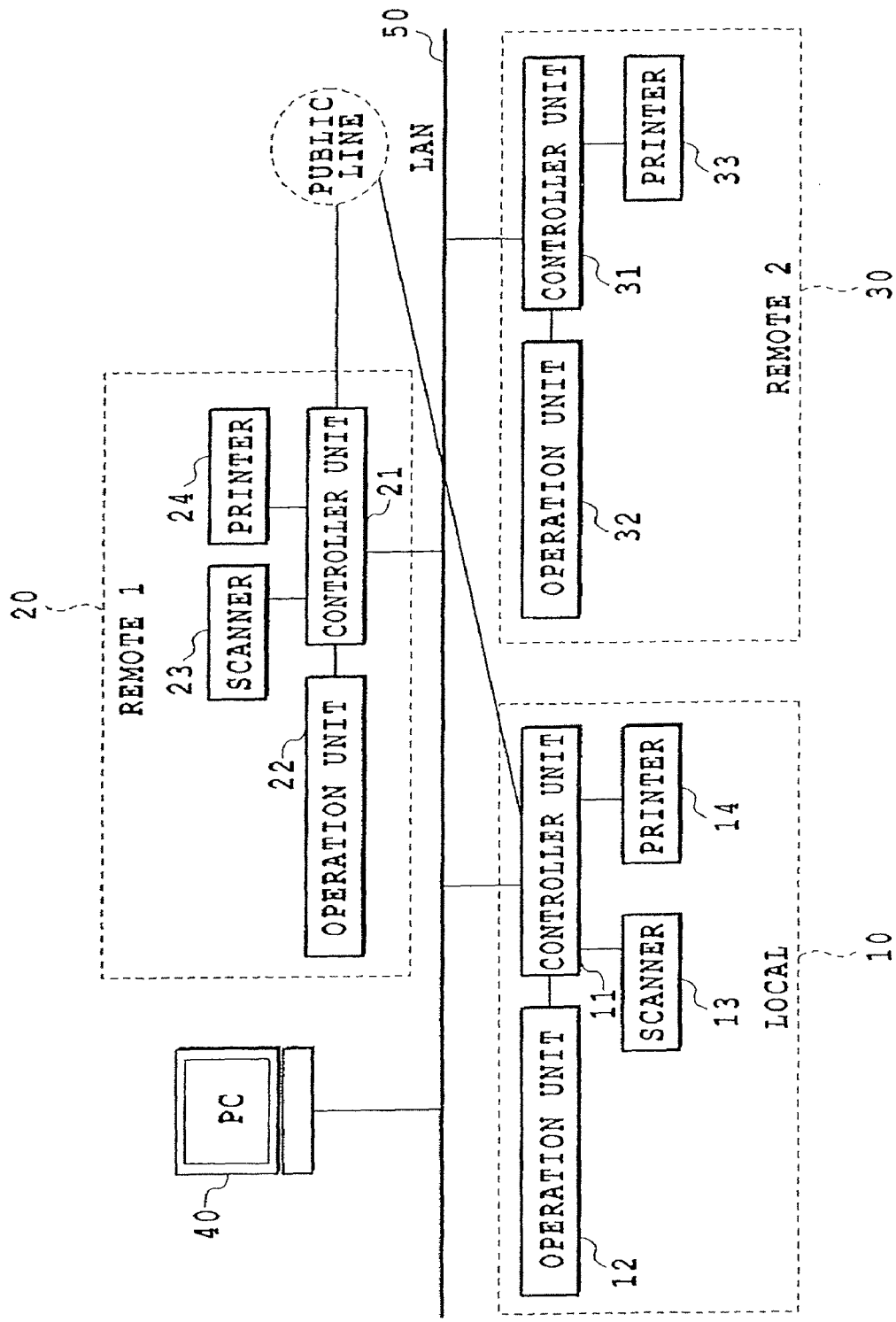
FIG. 1 is a diagram showing overall configuration of an image forming system according to an embodiment of the present invention.

FIG. 1 is a block diagram showing configuration of a printing system according to an embodiment of the present invention. A host computer 40 and three image forming apparatuses (10, 20 and 30) are connected to a LAN 50 in the system; however the connections are not limited to the number in the printing system according to the present invention. Similarly, though the LAN is applied as a connection method in this embodiment, the method is not limited to it. For example, any network such as a WAN (public line), a serial transmission scheme such as USB or a parallel transmission scheme such as Centronics or SCSI can also be applied.

The host computer (hereinafter, referred to as a PC) 40 has functions of a personal computer. The PC 40 can send and receive a file or send and receive an e-mail using the FTP or SMB protocol via the LAN 50 or a WAN. The PC 40 can also instruct the image forming apparatuses 10, 20 and 30 to print letters via a printer driver.

The image forming apparatuses 10 and 20 are apparatuses having the same configuration. The image forming apparatus 30 is an image forming apparatus having only a print function, which is, not having a scanner unit as in the image forming apparatus 10 or 20.

An image processing apparatus according to the present invention can be the image forming apparatus 10 or 20, while a database according to the present invention can be the host computer 40 or an apparatus connected to a public line. The description is hereinafter based on that the paper dactylogram data is registered as a database since a large amount of paper dactylogram data is needed in a case where certainty of comparison/determination of paper dactylograms is requested.

In the following, configuration of the apparatus 10 will be described in detail focusing on the image forming apparatus 10 of the image forming apparatuses 10 and 20 for simplicity of description.

The image forming apparatus 10 comprises a scanner unit 13 being an image input device, a printer unit 14 being an image output device, a controller (Controller Unit) 11, and an operation unit 12 being a user interface (UI). The controller 11 conducts operation control of the entire image forming apparatus 10. The operation unit 12 includes a display unit being a touch-sensitive panel.

<Image Forming Apparatus 10>

Figure 2:
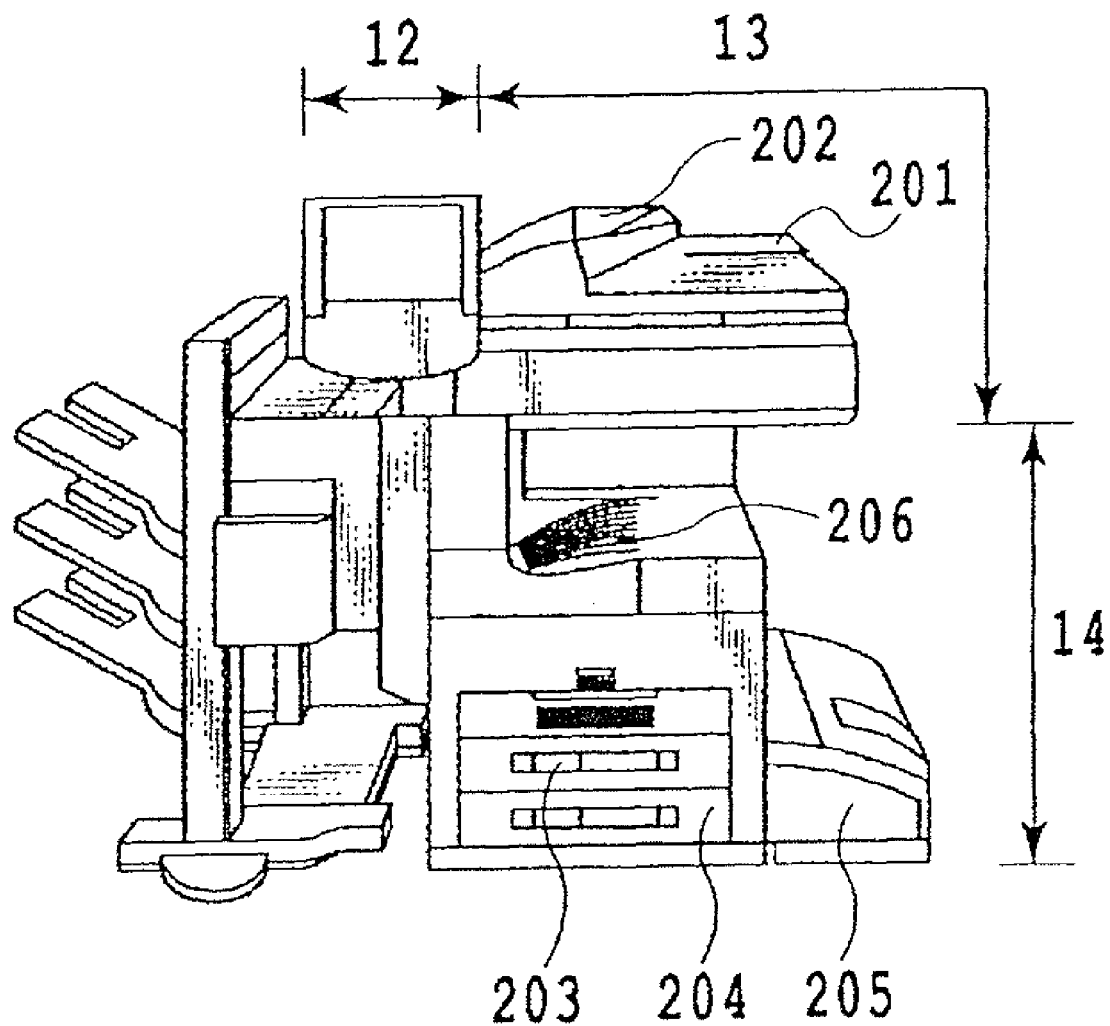
FIG. 2 is an external view showing an image forming apparatus 10 shown in FIG. 1.

FIG. 2 is an external view showing the image forming apparatus 10. The scanner unit 13 includes a plurality of CCDs being responsible to scan regions. If the sensitivity of each of the CCDs differs from others, then pixels are recognized to have different densities even if the pixels on an original manuscript have the same density. Because of this, the scanner unit exposes and scans a white board (a board being uniformly white) at the beginning, converts the amount of reflected light obtained by the exposure and scanning into an electric signal and outputs the result to the controller 11. As described below, a shading correcting unit 500 in the controller 11 recognizes difference among the sensitivities of the CCDs based on electric signals obtained from the CCDs. Then, the unit 500 uses the recognized difference among the sensitivities to correct a value of the electric signal obtained by scanning an image on the original manuscript, which is also a value of the electric signal inputted to an A/D converter as a preprocessor for the shading correcting unit 500. When the shading correcting unit 500 receives gain adjustment information from a CPU 301 in the controller 11 described below, it further controls a gain adjusting unit and performs gain adjustment depending on the information. The gain adjustment is used to adjust how to allocate a value of an electric signal obtained by exposing and scanning an original manuscript to a brightness signal value between 0 and 255. The gain adjustment allows converting the value of the electric signal obtained by exposing and scanning the original manuscript into a high brightness signal value or into a low brightness signal value. Subsequently, configuration to scan the image on the original manuscript will be described.

The scanner unit converts information of an image into an electric signal by inputting reflected light obtained by exposing and scanning the image on an original manuscript to a CCD. The unit further converts the electric signal into a brightness signal consisting of RGB colors and outputs the brightness signals as image data to the controller 11.

An original manuscript is set on a tray 202 of an original manuscript feeder 201. When a user carry out an operation to indicate start scanning on the operation unit 12, the controller 11 gives an original manuscript scan indication to the scanner unit 13. When the scanner unit 13 receives the indication, it feeds the original manuscript sheet by sheet from the tray 202 of the original manuscript feeder 201 for scan operation on the original manuscript. A scan method for an original manuscript can be a method of scanning the original manuscript by setting the original manuscript on a glass surface (not shown) and moving an exposing unit instead of an automatic feed scheme by the original manuscript feeder 201.

The printer unit 14 is an image forming device for produce image data received from the controller 11 on a paper sheet. Although an image forming scheme is an electro-photographic scheme using a photoconductive drum or a photoconductive belt in this embodiment, the present invention is not limited to it. For example, an ink jet scheme can be applied to print letters on a paper sheet by squirting ink from a micro nozzle array. The printer unit 14 is also provided with a plurality of paper sheet cassettes 203, 204 and 205 for allowing selection of different paper sheet sizes or different paper sheet orientations. Toward a paper ejecting tray 206, a paper sheet with printed letters is ejected.

<Detailed Description of Controller 11>

Figure 3:
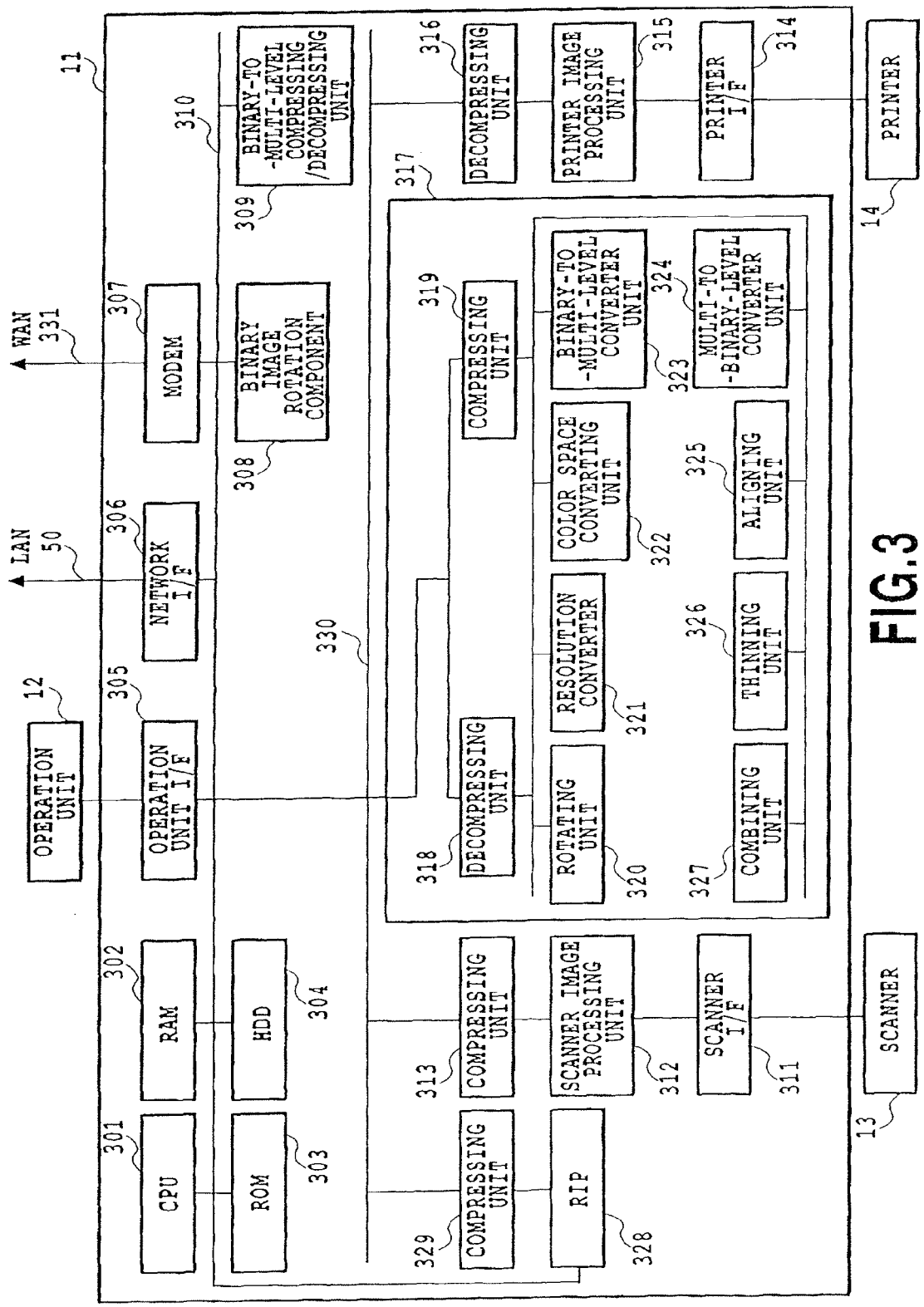
FIG. 3 is a diagram showing more detailed internal configuration of a controller 11 of the image forming apparatus 10.

FIG. 3 is a block diagram to describe configuration of the controller 11 in more detail.

The controller 11 is electrically connected to the scanner unit 13 and the printer unit 14, while it is connected to the PC 40, an external apparatus or the like via the LAN 50 or a WAN 331. The connection allows the controller 11 to input and output image data or device information.

The CPU 301 controls access to various types of devices in connection based on a control program stored in a ROM 303 or the like in a unified manner, and also controls various types of processing performed in the controller in a unified manner. A RAM 302 is a system working memory to be operated by the CPU 301 and is also a memory to temporally store image data. The RAM 302 includes an SRAM which retains stored contents after the power-off and a DRAM from which the stored contents are deleted after the power-off. The ROM 303 stores a boot program and the like for an apparatus. An HDD 304 is a hard disk drive which can store system software or image data.

An operation unit I/F 305 are an interface unit to connect a system bus 310 to the operation unit 12. The operation unit I/F 305 receives image data to be displayed on the operation unit 12 from the system bus 310 and outputs the data to the operation unit 12, as well as outputs information inputted from the operation unit 12 to the system bus 310.

A Network I/F 306 are connected to the LAN 50 and the system bus 310, input and output information. A modem 307 is connected to the WAN 331 and the system bus 310, input and output information. A binary level image rotating unit 308 converts the orientation of image data before transmission. A binary level image compressing/decompressing unit 309 converts the resolution of the image data before transmission into a pre-determined resolution or the resolution matching the ability of the destination. In the compression and decompression, a scheme such as JBIG, MMR, MR or MH is used. An image bus 330 is a transmission path configured in a PCI bus or IEEE 1394 to exchange image data.

A scanner image processing unit 312 corrects processes and edits image data received from the scanner unit 13 via a scanner I/F 311. The scanner image processing unit 312 also determines whether the received image data is a color original manuscript or a black and white original manuscript, whether it is an original manuscript containing letters or an original manuscript containing photographs or the like. Then, the unit 312 attaches the determination result to the image data. Such attached information is referred to as attribute data. Details of the processing performed in the scanner image processing unit 312 will be described below.

Figure 4:
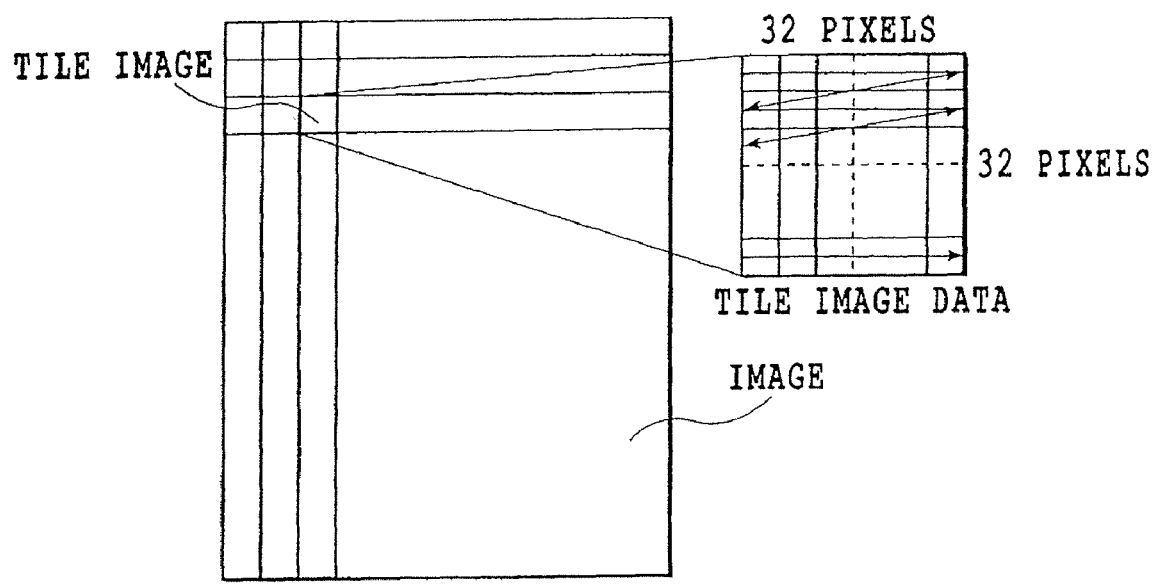
FIG. 4 is a conceptual diagram showing 32×32 pixel tile data used to represent image data in internal processing.

A compressing unit 313 receives the image data and partitions the image data into block units of 32 pixels×32 pixels. Such 32×32 pixel image data is referred to as tile data. FIG. 4 conceptually represents such tile data. A region corresponding to such tile data on an original manuscript (a paper medium before scanning) is referred to as a tile image. Tile data is supplied with average brightness information on its 32×32 pixel blocks or a coordinate position on an original manuscript of a tile image as header information. The compressing unit 313 further compresses image data consisting of a plurality of tile data.

A decompressing unit 316 decompresses and then rasterizes the image data consisting of a plurality of tile data and sends the result to a printer image processing unit 315.

The printer image processing unit 315 receives the image data sent from the decompressing unit 316 and performs image processing on the image data by referring to attribute data attached to the image data. The image data subjected to the image processing is outputted to the printer unit 14 via a printer I/F 314. Details of the processing performed in the printer image processing unit 315 will be described later.

An image converting unit 317 performs pre-determined conversion processing on the image data. The processing unit comprises processing units as described below.

A decompressing unit 318 decompresses the received image data. A compressing unit 319 compresses the received image data. A rotating unit 320 rotates the received image data. A resolution converter 321 performs resolution conversion processing (for example, from 600 dpi into 200 dpi) on the received image data. A color space converting unit 322 converts a color space of the received image data. The color space converting unit 322 can perform known ground (basic color) erasure processing using a matrix or a table, known LOG conversion processing (RGB →CMY), or known output color correction processing (CMY →CMYK). A binary/multi-level converting unit 323 converts the received bi-level image data into 256-level image data. On the contrary, a multi-value/binary-level converting unit 324 converts the received 256-level image data into bi-level image data through an approach such as error diffusion processing.

A combining of unit 327 combines the two received image data to generate a one of image data. The combining two image data utilizes a method wherein an average value of brightness values of pixels to be combined is used as a combined brightness value, or a method wherein the brightness value of a pixel being brighter at the brightness level is used as the brightness value of the pixel after the combining. It can also utilize a method using the darker one as a pixel subjected to the combine. Further, a method of deciding the brightness value after combining such as by a logical OR operation, a logical AND operation or an exclusive OR operation on pixels to be combined can be also applied. These combine methods are all known approaches. A thinning unit 326 performs resolution conversion by thinning the pixels of the received image data to generate such as ½, ¼ or ⅛ image data. An aligning unit 325 gives a margin part (blank part) to the received image data or removes the margin part.

A RIP 328 receives intermediate data generated based on PDL code data sent from the PC 40 or others and generates bit map data (multi-level).

<Detailed Description of Scanner Image Processing Unit 312>

Figure 5:
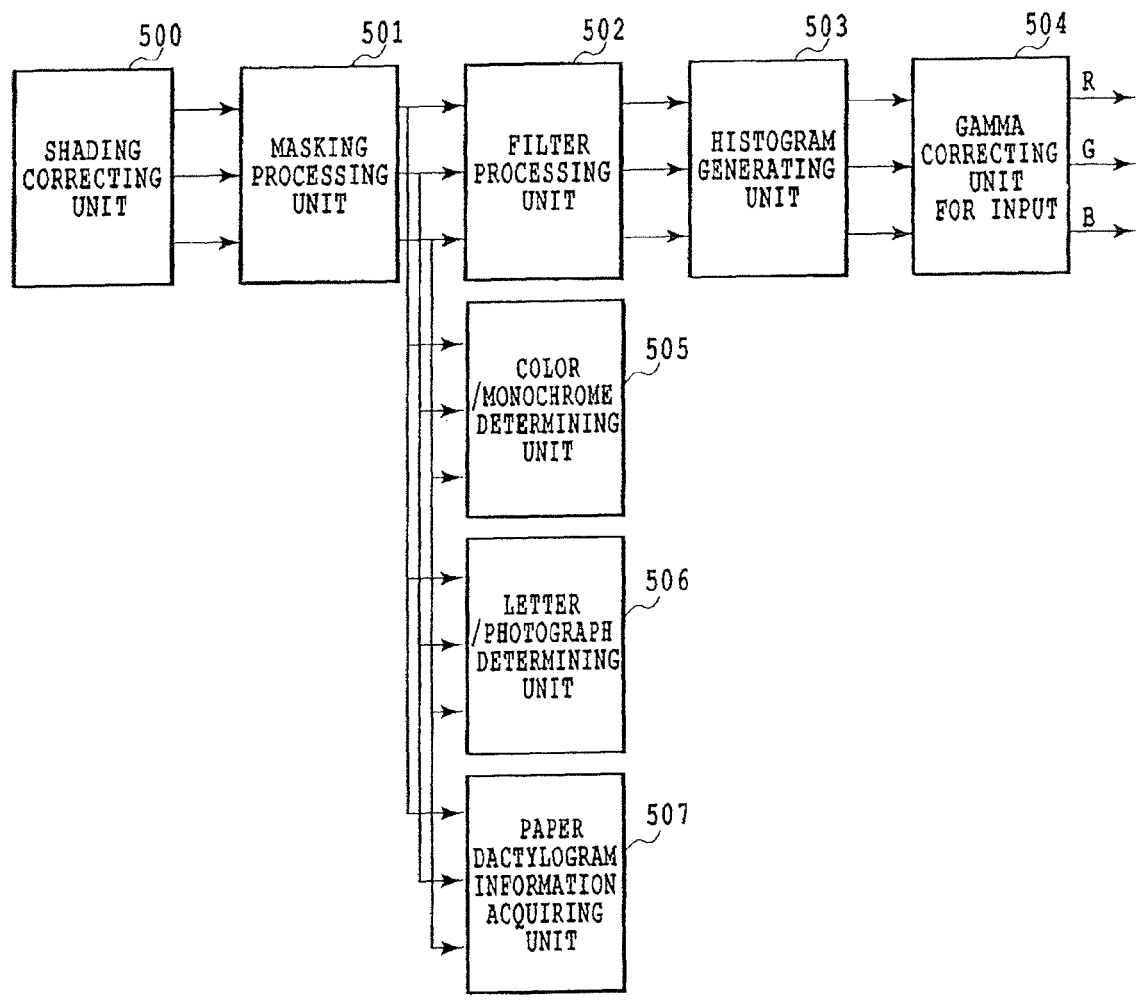
FIG. 5 is a diagram showing internal configuration of a scanner image processing unit 312.

FIG. 5 shows internal configuration of the scanner image processing unit 312.

The scanner image processing unit 312 receives an image data, which is gain adjusted signal of an output from the CCD of the scanner unit 13 using a gain adjusting unit, and which is consisting of A/D converted eight-bit RGB brightness signals.

The shading correcting unit 500 performs shading correction on the brightness signals. Shading correction is the processing to prevent false recognition of the lightness of an original manuscript due to variations in sensitivities of CCDs, as described above. The shading correcting unit 500 can, as described above, internally perform so-called shading correction and execute gain control on the above gain adjusting unit according to an indication from the CPU 301 to perform appropriate gain adjustment.

Subsequently, the brightness signals are converted into standard brightness signals not depending on filter colors of the CCDs by a masking processing unit 501.

A filter processing unit 502 corrects the space frequency of the received image data arbitrarily. The processing unit performs arithmetic processing using a 7×7 matrix on the received image data, for example. Meanwhile, a copier or a multi-function copier can select a letter mode, a photograph mode or a letter/photograph mode as a copy mode by pushing a tab 704 in FIG. 7 as described later. When a user selects a letter mode, the filter processing unit 502 passes entire image data through a filter for a letter. When a user selects a photograph mode, the unit 502 passes the entire image data through a filter for a photograph. When a user selects a letter/photograph mode, the unit 502 adaptively switches the filters for each pixel depending on a letter/photograph determination signal (part of attribute data) described below. That is, it is decided whether the filter for a photograph or the filter for a letter is used for each pixel. The filter for a photograph has a coefficient being set to smooth only high-frequency components. The coefficient serves to make the roughness of an image indistinctive. The filter for a letter has a coefficient being set to give greater edge emphasis. The coefficient serves to improve the sharpness of a letter.

A histogram generating unit 503 samples brightness data of each pixel constituting the received image data. To describe it in more detail, it samples brightness data in a rectangle region surrounded from start points to end points designated for the main scan orientation and the vertical scan orientation at a fixed pitch in the main scan orientation and the vertical scan orientation. Then, it generates histogram data based on the sampling result. The generated histogram data is used to estimate a ground level in the ground erasure processing. A gamma correcting unit for input 504 converts the data into brightness data including nonlinear characteristics by using a table or the like.

A color/monochrome determining unit 505 determines whether each pixel constituting the received image data has a chromatic color or an achromatic color, and attaches the determination result as a color/monochrome determination signal (part of attribute data) to the image data.

A letter/photograph determining unit 506 determines whether each pixel constituting the image data is a pixel constituting a letter, a pixel constituting a halftone dot, a pixel constituting the letter in the halftone dot, or a pixel constituting a solid picture based on the pixel value of each pixel and the pixel values of surrounding pixels of each pixel. A pixel other than the above pixels is a pixel constituting a white region. Then, the determination result is attached to the image data as a letter/photograph determination signal (part of attribute data).

A paper dactylogram information acquiring unit 507 acquires image data of RGB image data inputted from the shading correcting unit 500. Processing by the paper dactylogram information acquiring unit 507 will be described later.

<Detailed Description of Printer Image Processing Unit 315>

Figure 6:
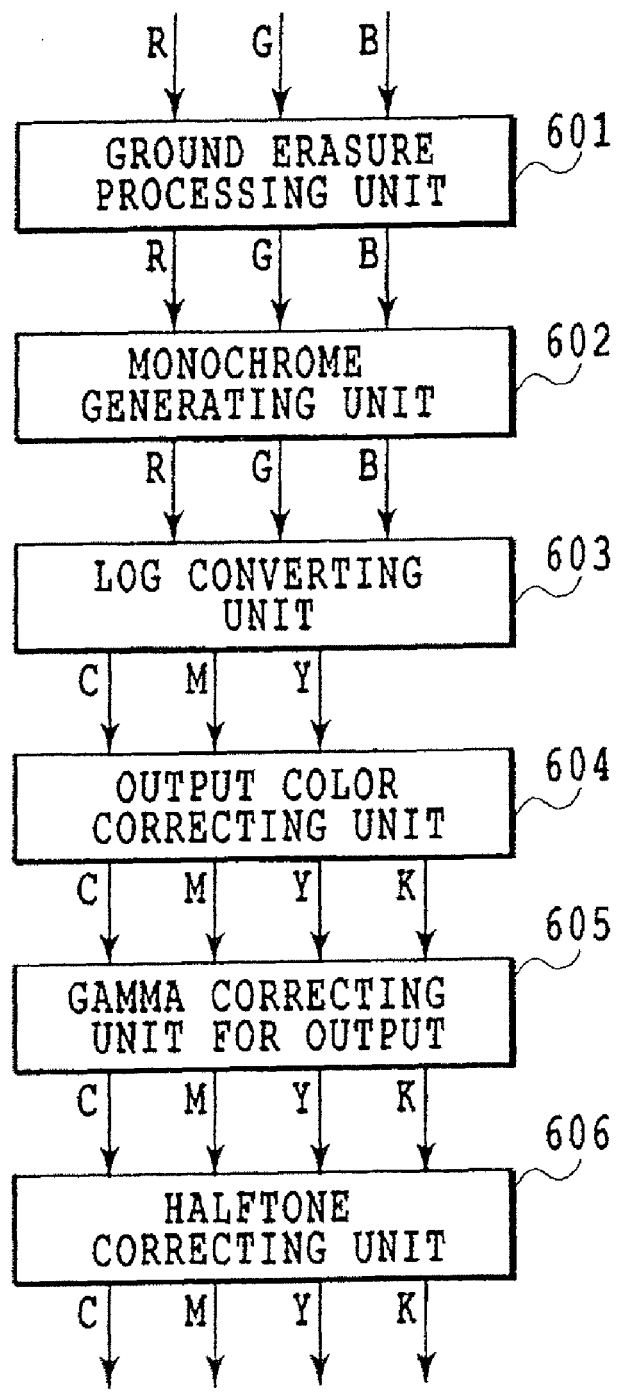
FIG. 6 is a diagram showing the flow of processing performed in a printer image processing unit 315.

FIG. 6 shows the flow of processing performed in the printer image processing unit 315.

A ground erasure processing unit 601 erases (removes) a ground color (basic color) of image data by using a histogram generated by the scanner image processing unit 312. A monochrome generating unit 602 converts color data into monochrome data. A log converting unit 603 performs brightness-to-density conversion. The log converting unit 603 converts, for example, image data inputted in RGB into CMY image data. An output color correcting unit 604 corrects an output color. For example, it converts image data inputted in CMY into CMYK image data using a table or a matrix. A gamma correcting unit for output 605 corrects a signal value inputted to the gamma correcting unit for output 605 to be proportional to a reflected density value after copy output. A halftone correcting unit 606 performs halftone processing according to the number of levels of a printer unit for outputting. For example, it digitizes received high-level image data into binary data, 32 value data or the like.

The processing unit such as the scanner image processing unit 312 or the printer image processing unit 315 can also output the received image data without performing the processing on the data. Passing data without subjecting to processing in a certain processing unit in this way will be hereinafter referred to as "passing data through a processing unit".

<Description of Operation Screen>

Figure 7:
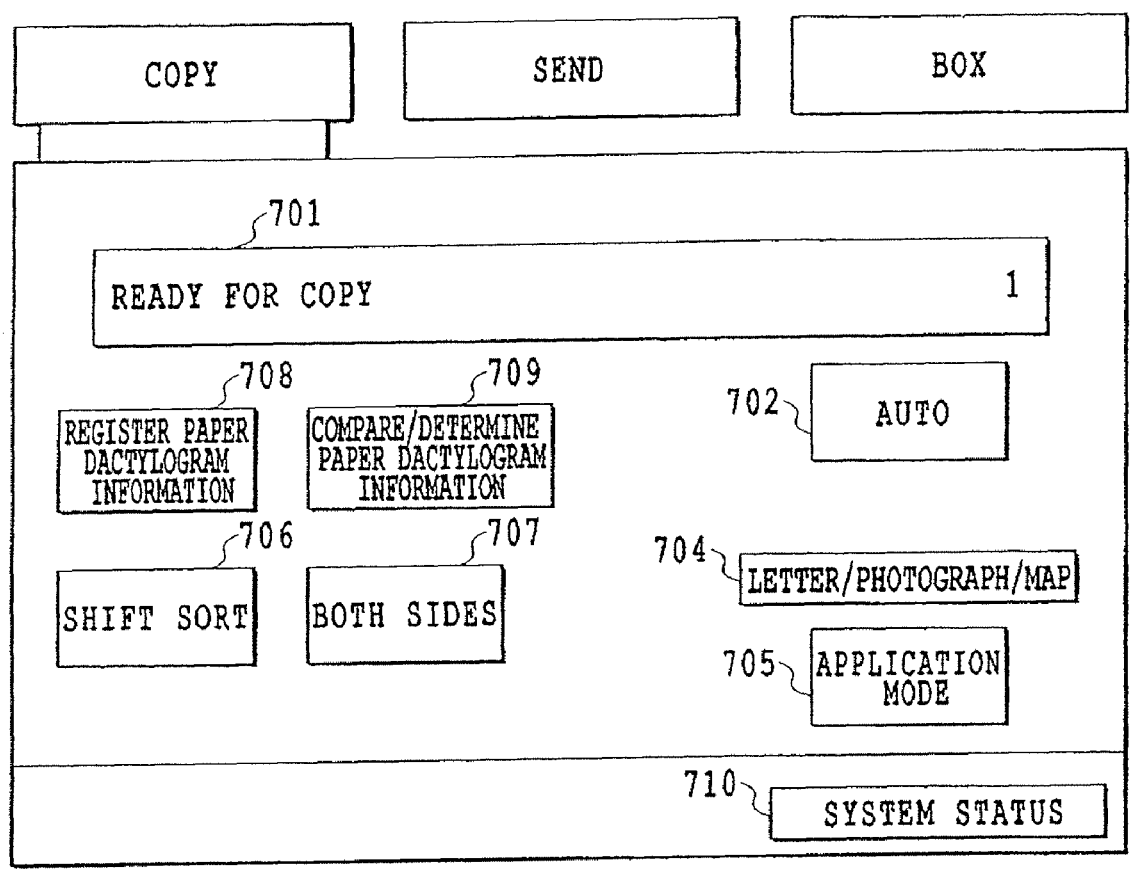
FIG. 7 is a diagram showing an initial screen on a display unit of an operation unit 12 of the image forming apparatus 10.

FIG. 7 shows an initial screen on a display unit of the operation unit 12 of the image forming apparatus 10. A region 701 indicates whether or not the image forming apparatus 10 is ready for copy and also indicates the number of copies being set. An original manuscript selection tab 704 is a tab for selecting the type of an original manuscript. When the tab 704 is pushed, three kinds of selection menus of letter, photograph and letter/photograph modes are popped up. An application mode tab 705 is for selecting an application mode. A finishing tab 706 is a tab for setting up for various types of finishing. A both-side setting tab 707 is a tab for setting up for both-side scan and both-side print. A scan mode tab 702 is a tab for selecting a scan mode for an original manuscript. When the tab 702 is pushed, three kinds of selection menus of color/black/auto (ACS) are popped up. If a color mode is selected, color copy is executed. If a black mode is selected, monochrome copy is executed. If an ACS mode is selected, a copy mode is decided according to the above monochrome/color determination signals.

A region 708 is a tab to select paper dactylogram information registration processing. The paper dactylogram information registration processing will be described below. A region 709 is a tab to select paper dactylogram information comparison/determination processing. The paper dactylogram information comparison/determination processing will be described below.

A region 710 is a tab for showing the system status. When the tab is pushed, an image data list saved in the HDD 304 in the image forming apparatus 10 is displayed on a display screen.

<Operation When Paper Dactylogram Information Registration Processing Tab is Pushed (Paper Dactylogram Information Registration Processing at Copying)>

Figure 8:
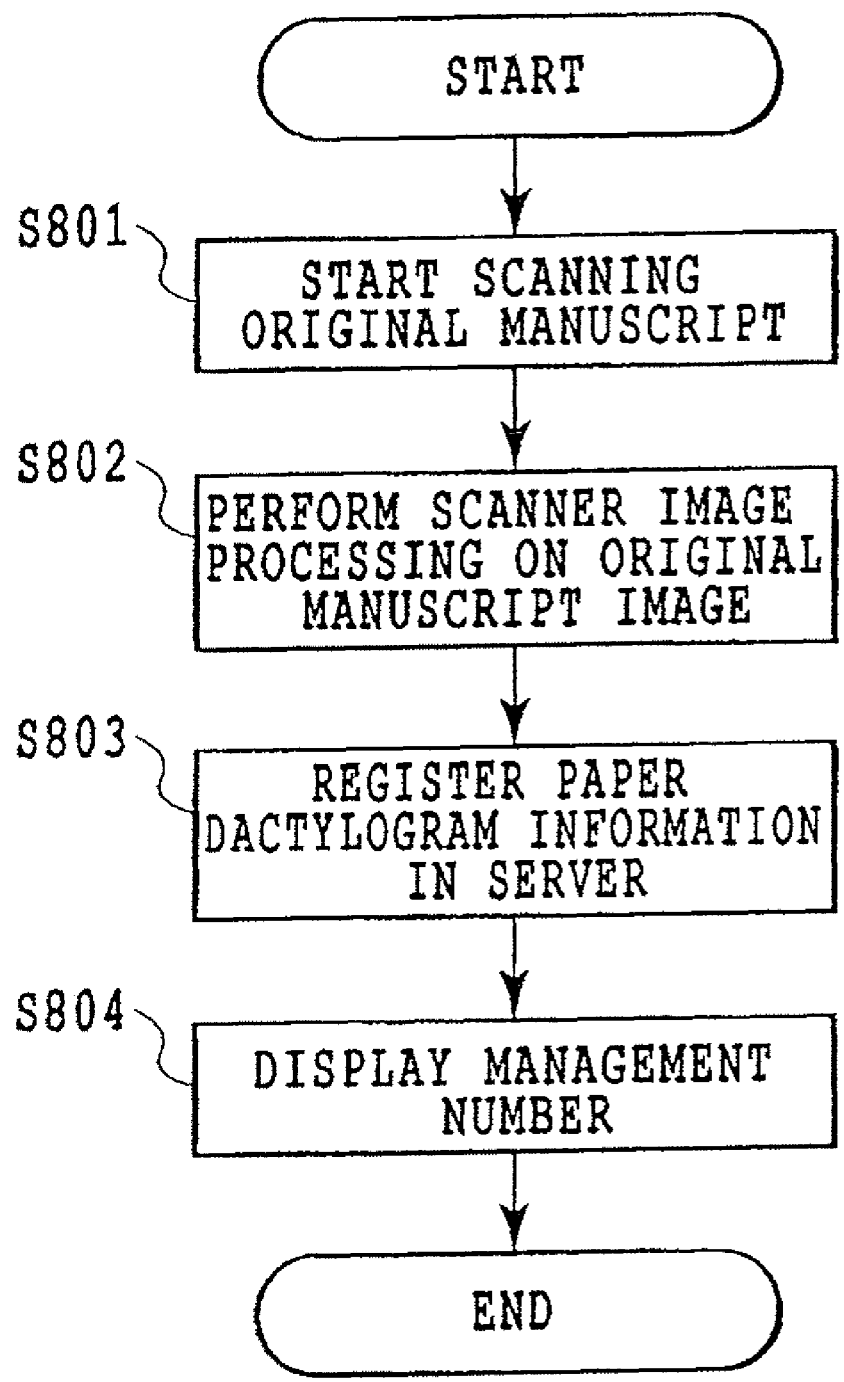
FIG. 8 is a flowchart showing processing that is executed when a paper dactylogram information registration processing tab is pushed.

The following will describe paper dactylogram information registration processing that is executed when a user pushes the paper dactylogram information registration tab 708 shown in FIG. 7 and then pushes a start key, with reference to FIG. 8.

FIG. 8 is a diagram showing processing to register a dactylogram of paper of the paper document in a database for its subsequent confirmation processing whether or not a paper document is original paper by the CPU 301 or the controller 11.

Figure 9:
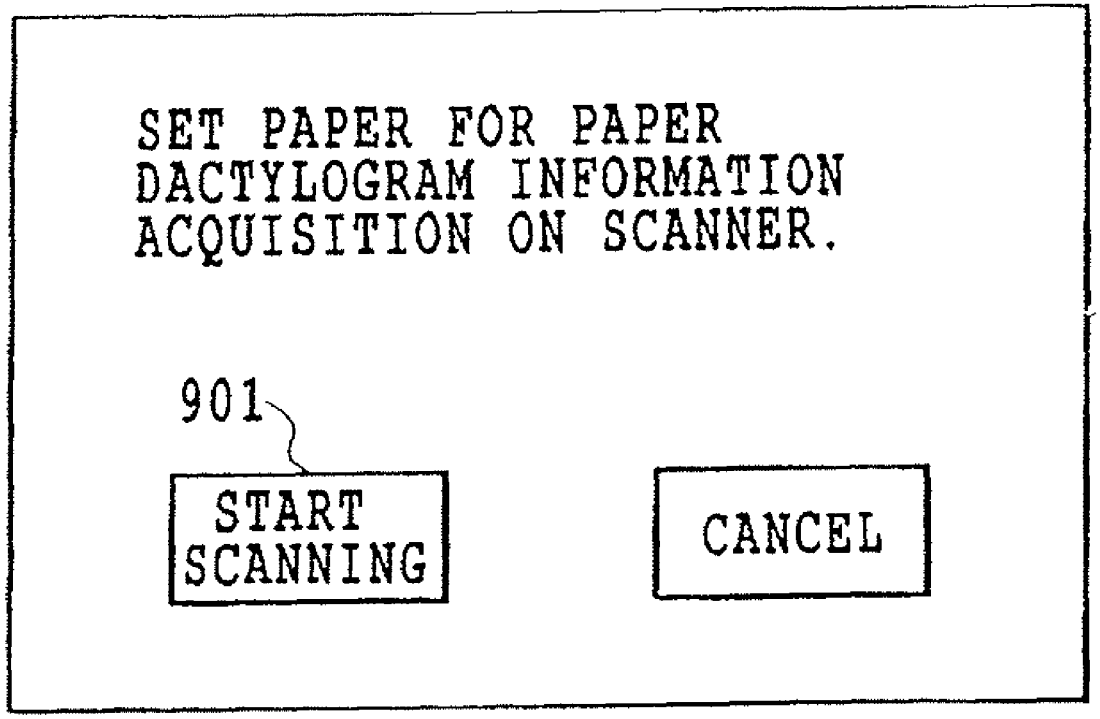
FIG. 9 is a diagram showing a paper dactylogram information scan indication screen of the operation unit.

When the paper dactylogram information registration tab 708 is pushed, a dialog (FIG. 9) is displayed to prompt to set paper whose paper dactylogram information is acquired on a scanner. When a start scanning button 901 is pushed in the dialog, the paper dactylogram information acquisition processing is started.

At step 801, the CPU 301 controls the scanner unit 13 to scan an original manuscript, and the scanned original manuscript data to be sent as image data to the scanner image processing unit 312 via the scanner I/F 311. In this case, the scanning by the scanner unit 13 is executed in a mode for scanning a feature image of a paper surface being a region not recorded on the original manuscript due to the pushing of the paper dactylogram information registration tab 708 differently from a mode of normal scanning of an original manuscript. Generally, control of the amount of exposure on a CCD is executed, and an image is picked up in an exposure range where the CCD has a linear sensitivity. Particularly, control for weak lighting of an original manuscript or control to reduce integration period in a CCD is performed.

However, the above control is not always necessary, but control of weak lighting or control of integration period in a CCD is unnecessary if an image on a paper surface is obtained in a region having a linear sensitivity not being a saturate region in the normal scanning. But otherwise, if obtained characteristics of a paper surface are to be precisely extracted, that is, if the fact that the paper is original paper is to be assured with a higher accuracy, it is desired to pick up an image on the paper surface in a more linear region.

During the exposure processing, the shading correcting unit 500 may perform gain adjustment according to an indication from the CPU 301. This is adjustment for the maximum value of an output from a CCD to fall within an A/D conversion region.

At step 802, the paper dactylogram information acquiring unit 507 performs image processing based on the scanned image data. Then, the data obtained as the processing result is sent to the RAM 302 via a data bus (not shown). The image processing will be described with reference to FIG. 10.

Figure 10:
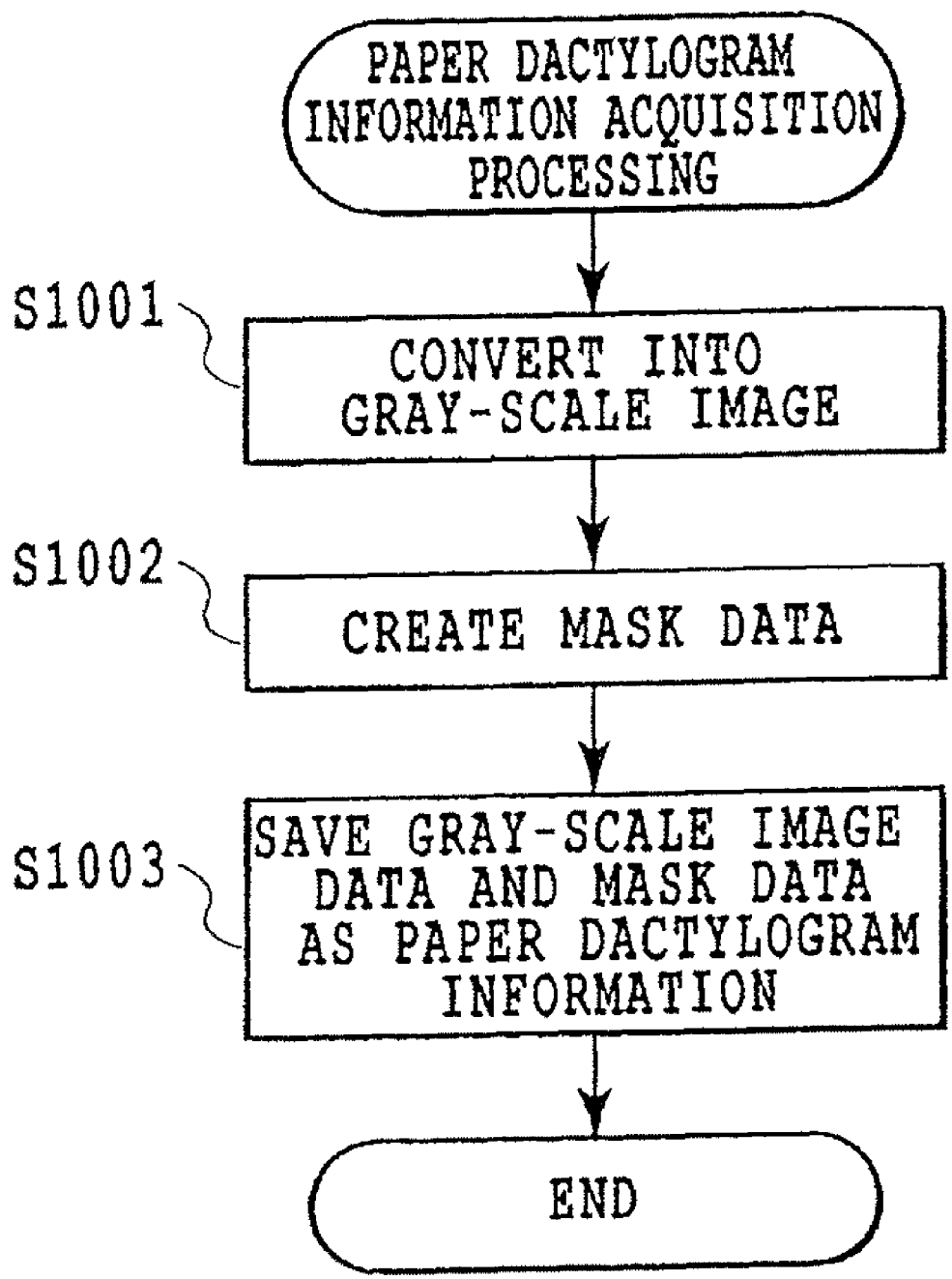
FIG. 10 is a flowchart showing paper dactylogram information acquisition processing.

FIG. 10 is a flowchart showing paper dactylogram information acquisition processing performed by the CPU 301 or the controller 11 using the paper dactylogram information acquiring unit 507 shown in FIG. 5.

At step 1001, image data of a plurality of regions acquired in the paper dactylogram information acquiring unit 507 is converted into gray-scale image data. At step 1002, a mask data is created to remove a matter that could be factors causing erroneous result of comparison/determination, such as printed or hand-written letters, from the image converted into the gray-scale image data at step 1001. Mask data is binary data of "0" or "1". A mask data value of a pixel whose brightness signal value is a first threshold or more (i.e., a bright pixel) in the gray-scale image data is set to "1". A mask data value of a pixel whose brightness signal value is less than the first threshold is set to "0". The above processing is performed on all pixels contained in the gray-scale image data.

At step 1003, the two data of the image data converted into gray-scale data at step 1001 and the mask data created at step 1002 are sent to the RAM 302 and saved there.

<Paper Dactylogram Information Cutout Processing>

Figure 13:
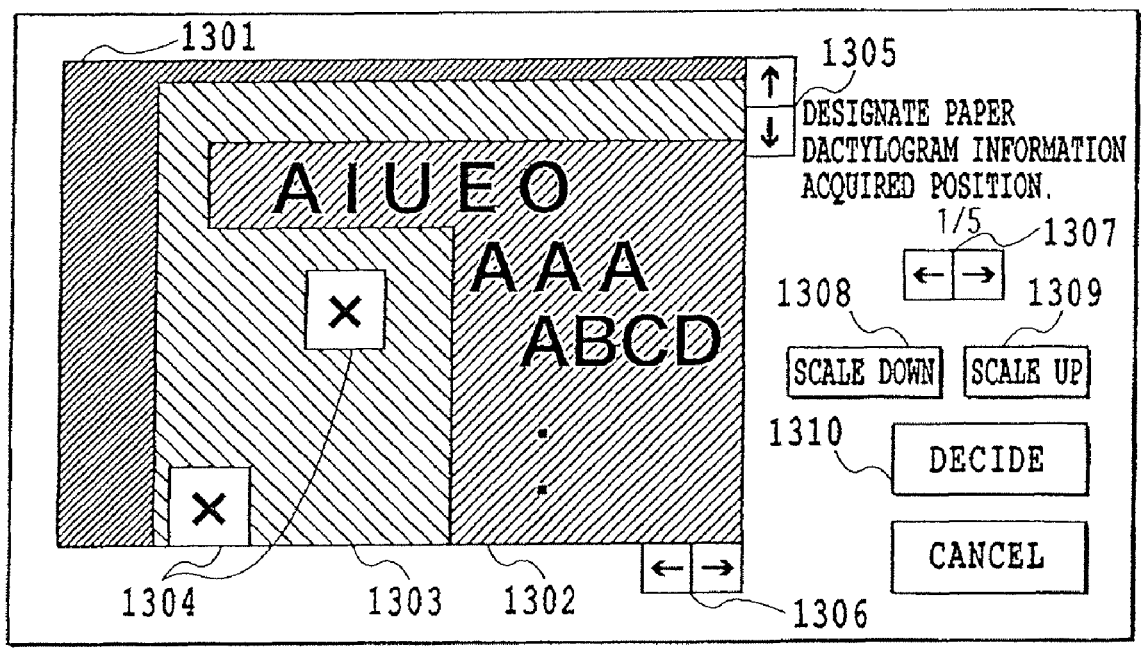
FIG. 13 is a diagram showing an example of a user interface screen for giving an indication at a paper dactylogram information acquired position on the operation unit.

A region for acquiring paper dactylogram information from the two data sent to the RAM 302 by the paper dactylogram information acquiring unit 507 is cut out. FIG. 13 is a diagram showing an example of a paper dactylogram information acquired position indication screen. In FIG. 13, reference numeral 1301 denotes a screen for designating a region for acquiring the dactylogram information on the image, in which a rectangle region where paper dactylogram information can be obtained is superimposed on the mask image which is scanned at step 801 and processed at step 802. Reference numeral 1302 denotes a region where mask data is 0, while reference numeral 1303 denotes a region where mask data is 1. Reference numeral 1304 denotes regions that a user has designated on a touch-sensitive panel. The drawing shows part of an original manuscript image, by button operations of reference numerals 1305 and 1306; an original manuscript image region to be displayed in a region denoted by reference numeral 1301 can be moved. A number "⅕" above reference numeral 1307 represents that up to five regions can be designated and the first one of the regions is being currently operated. Reference numeral 1307 denotes a button for selecting one of the five regions for the operation. Reference numerals 1308 and 1309 denote buttons for indicating to scale down and scale up the shape of an acquired region in operation. Reference numeral 1310 denotes a button to be pushed when fixing the acquired region being currently set.

The cutout is performed based on one or more pieces of acquired position information designated on the user interface screen shown in FIG. 13. The size or shape of a cut out region can be a predetermined region or be designated by the operation unit 12.

Figure 11:
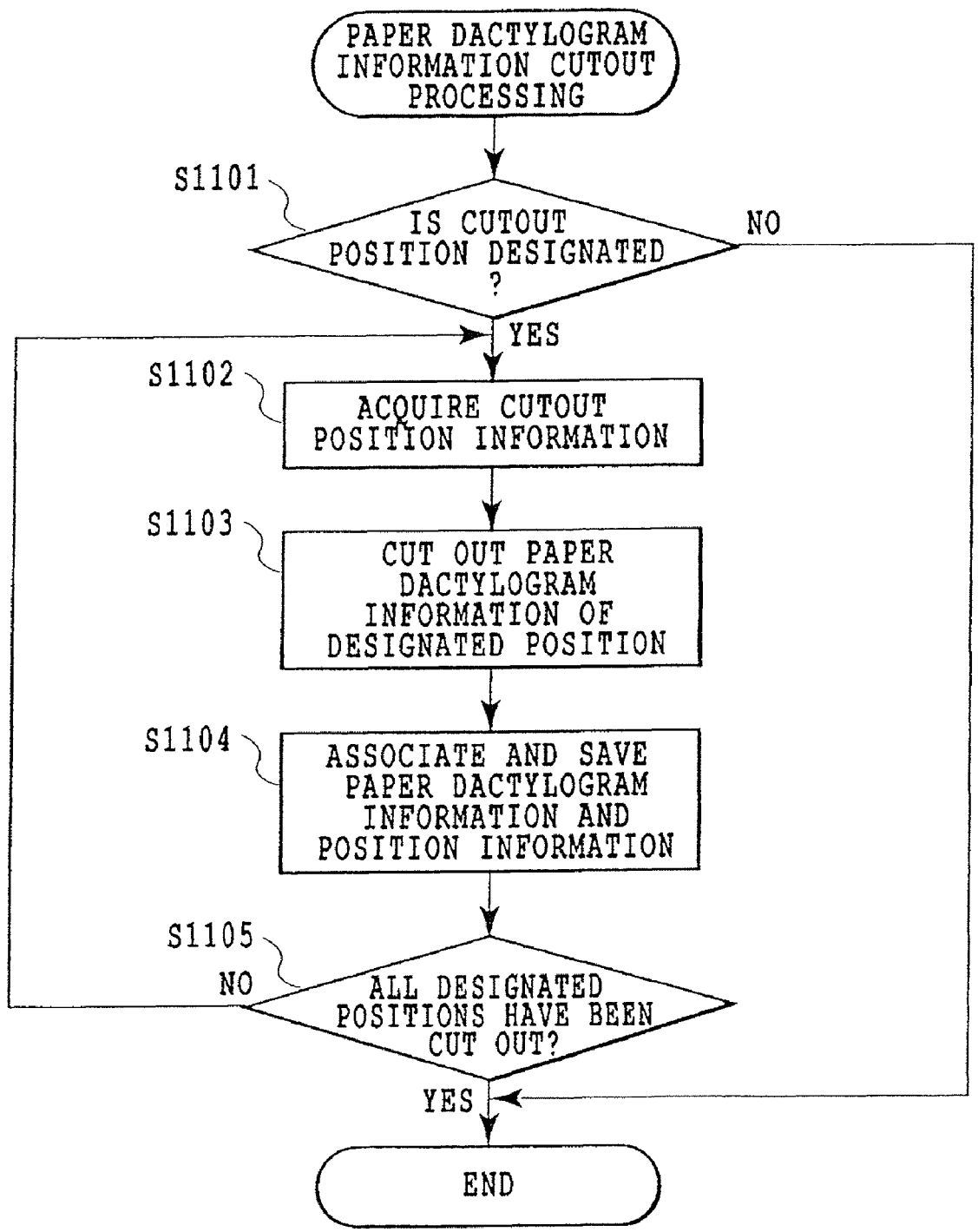
FIG. 11 is a flowchart of paper dactylogram information cutout processing at a designated position.

FIG. 11 is a flowchart of the cutout processing executed by the CPU 301. The CPU 301 determines at step 1101 whether or not designating a cutout position of paper dactylogram information has been done by using the operation unit 12. If done, cutout position information is acquired at step 1102. Otherwise, if it is determined that the position has not been designated, the processing terminates. At step 1103, gray-scale image data of a pre-determined region sent from the paper dactylogram information acquiring unit 507 to the RAM 302 and mask data are read out, and paper dactylogram information at the position acquired at step 1102 is cut out. At step 1104, the cut out gray-scale image data and the mask data are associated with the cutout information (including the position and size) and saved.

Figure 12:
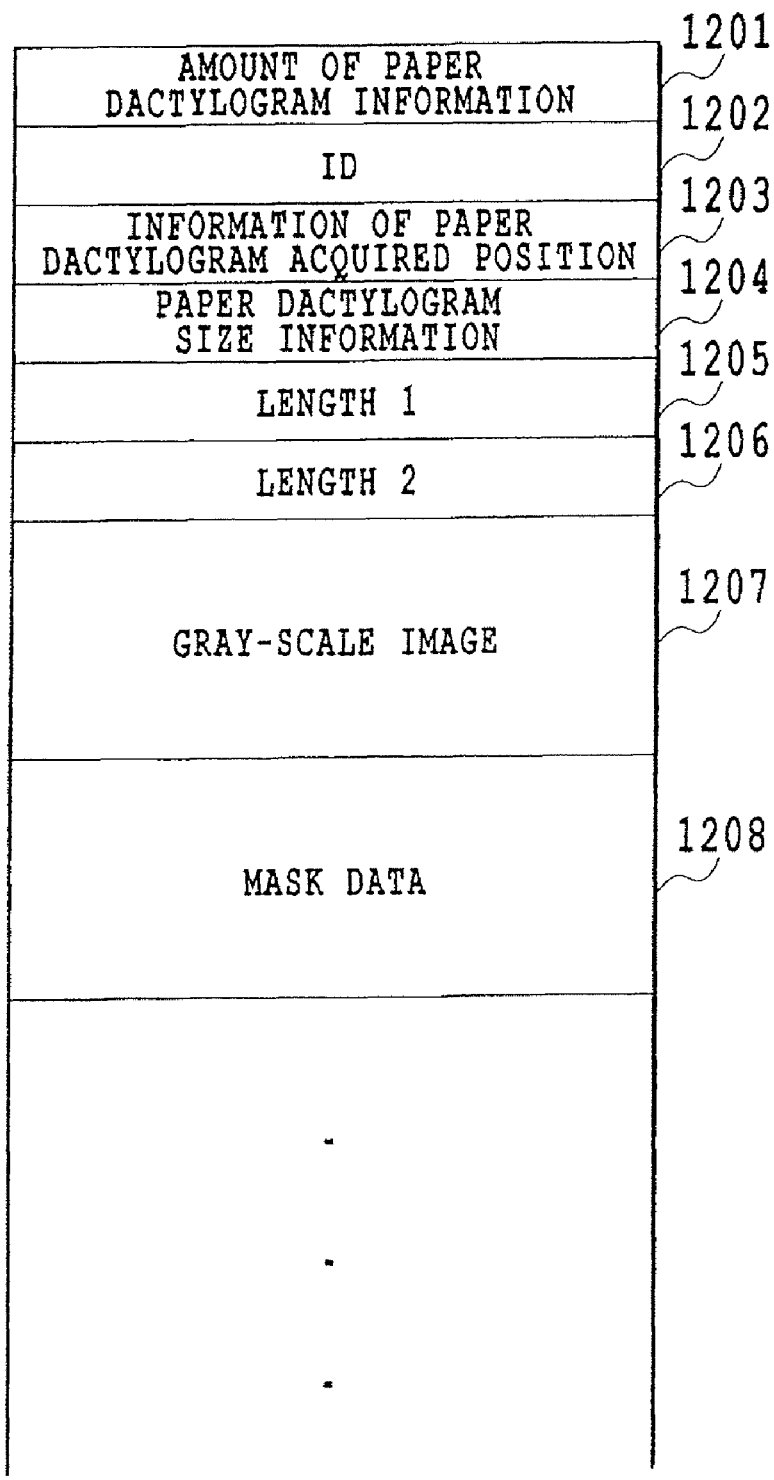
FIG. 12 is a diagram showing stored data structure of paper dactylogram information.

FIG. 12 is a diagram showing an example of data structure to save that information. Reference numeral 1201 denotes the number of paper dactylogram regions on a sheet of original manuscript, while reference numeral 1202 denotes an ID to identify individual paper. Each of reference numerals 1203 to 1208 denotes respective data of a paper dactylogram region, followed by similar data by the amount of paper dactylogram information.

The cutout paper dactylogram information can be retained in the RAM 302 or saved in the HDD 304. At step 1105, it is determined whether paper dactylogram information has been cut out at all positions designated by the operation unit 12. If not, the processing is repeated from step 1102 to cut out paper dactylogram information. If it is determined that paper dactylogram information has been cut out at all the designated positions, the processing terminates.

If pluralities of cutout shapes are allowed, the cutout information may include shape information. According to the above data structure, multiple pieces of paper dactylogram information are saved as paper dactylogram data of an original manuscript.

The image data itself converted into gray-scale data at step 1101 may be referred to as paper dactylogram information. However, in this embodiment, the above three data (gray-scale image data mask data and cut out information) are referred to as paper dactylogram information.

The paper dactylogram information acquiring unit 507 sends (all of) paper dactylogram information obtained by scanning a paper document to the RAM 302 using the data bus (not shown). In this embodiment, the description will continue using an example of storing the acquired paper dactylogram information in the RAM. However, the present invention does not limit a storage region of paper dactylogram information to a RAM, but the HDD 304, an external storage device or an external database system connected to the apparatus according to the present invention via a network can be used as the storage.

Returning to FIG. 8, when the processing at step 802 terminates, the processing at step 803 is started.

At step 803, the CPU 301 accesses a server, requests the server to issue a management number, associates the management number and paper dactylogram information with each other and registers them in the server.

At step 804, the CPU 301 controls to display the management number on the display screen.

<Operation When Paper Dactylogram Information Comparison/Determination Processing Tab is Pushed>

Subsequently, an operation when a user pushes the paper dactylogram information comparison/determination tab 709 shown in FIG. 7 and then pushes a start key will be described with reference to FIG. 14.

Figure 14:
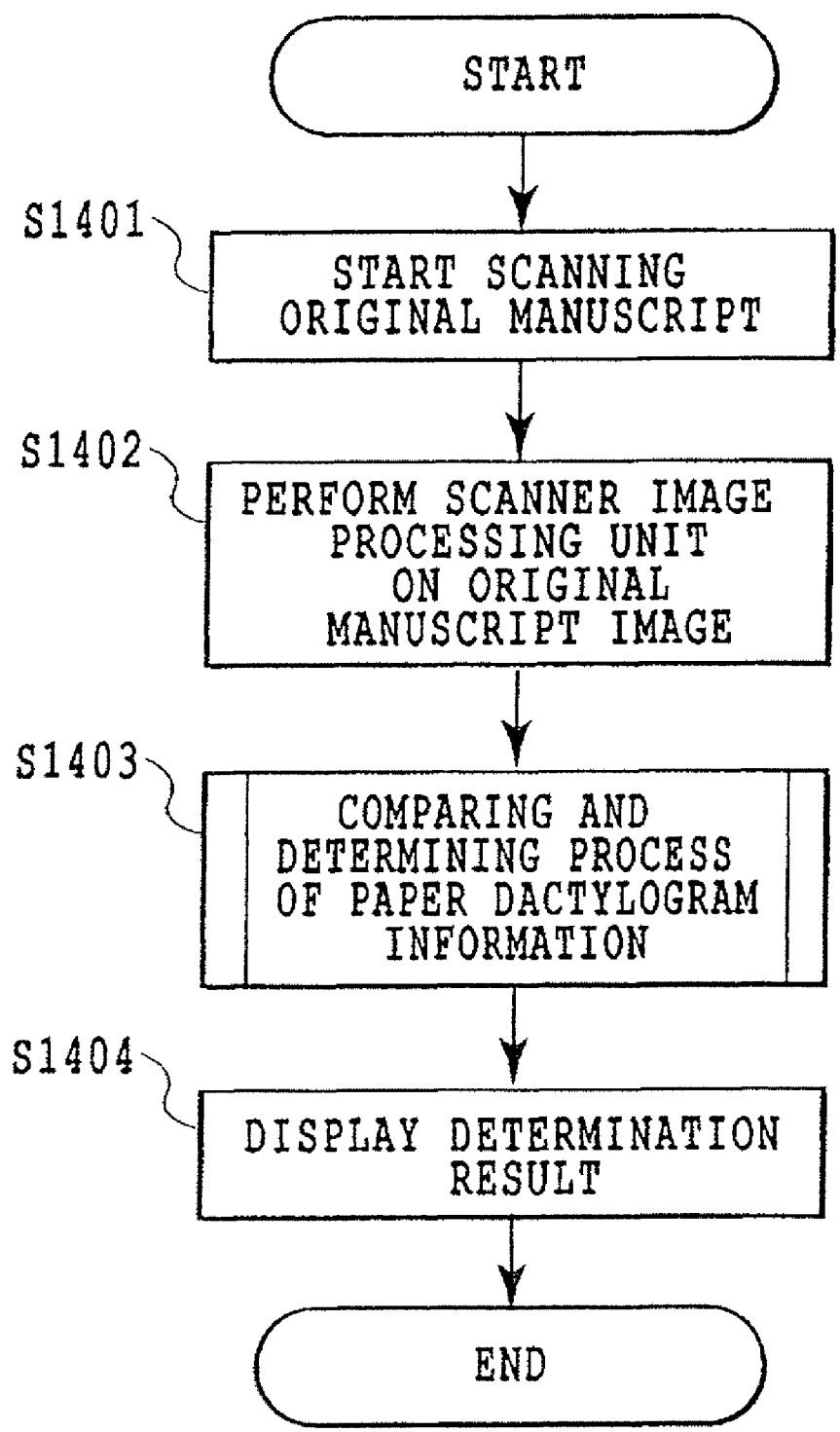
FIG. 14 is a flowchart showing processing that is executed when a paper dactylogram information comparison/determination processing tab is pushed.

FIG. 14 is a flowchart showing the paper dactylogram information comparison/determination processing performed by the CPU 301 or the controller 11. Steps in this flowchart are controlled by the CPU 301 in a unified manner.

At step 1401, the CPU 301 controls so as to performs scanning by the scanner unit 13 and sending the scanned original manuscript as image data to the scanner image processing unit 312 via the scanner I/F 311. This is same as the processing at step 801 in FIG. 8.

At step 1402, the scanner image processing unit 312 performs the processing shown in FIG. 5 on the image data to generate new image data as well as attribute data. The unit 312 also attaches the attribute data to the image data.

At step 1402, the scanner image processing unit 312 further performs the processing at steps 1001 and 1002 in FIG. 10 on the image data to generate gray-scale image data and mask data. The unit 312 also attaches the mask data to the gray-scale image data. The generated data is sent to the RAM 302 via the data bus (not shown).

At step 1403, registered paper dactylogram information associated with a scanned original manuscript is acquired in a state of being associated with an inputted management number from, for example, in an external server or other image forming apparatuses, or the HDD 304 in its image forming apparatus. Then, the acquired information is sent to the RAM 302 via the data bus (not shown). The acquisition of registered paper dactylogram information can be executed in advance by a user operation before a user pushes the paper dactylogram information comparison/determination tab 709, and stored in the HDD 304 or the like in the image forming apparatus.

In another embodiment, at step 1403, a code recorded at a pre-determined position of the original manuscript data scanned at the previous step 1401 may be read, and a database can be searched based on a result of scanning the code to acquire corresponding paper dactylogram information.

Next, the CPU 301 performs the paper dactylogram information comparison/determination processing. The processing is executed based on the acquired registered paper dactylogram information, and the determination result is the displayed in step 1404. The paper dactylogram information comparison/determination processing will be described with reference to FIG. 15.

<Paper Dactylogram Information Comparison/Determination Processing>

The CPU 301 can mach the gray-scale image data sent from the paper dactylogram information acquiring unit 507 to the RAM 302 against the registered paper dactylogram information to control comparison/determination of the both paper dactylograms. The degree of similarity (also referred to as the degree of identity) as the comparison/determination result is presented to a user. It is assumed that Registered paper dactylogram information is stored in one or more storage regions such as the RAM 302, the HDD 304, code image database, an external storage device or an external database server.

Figure 15:
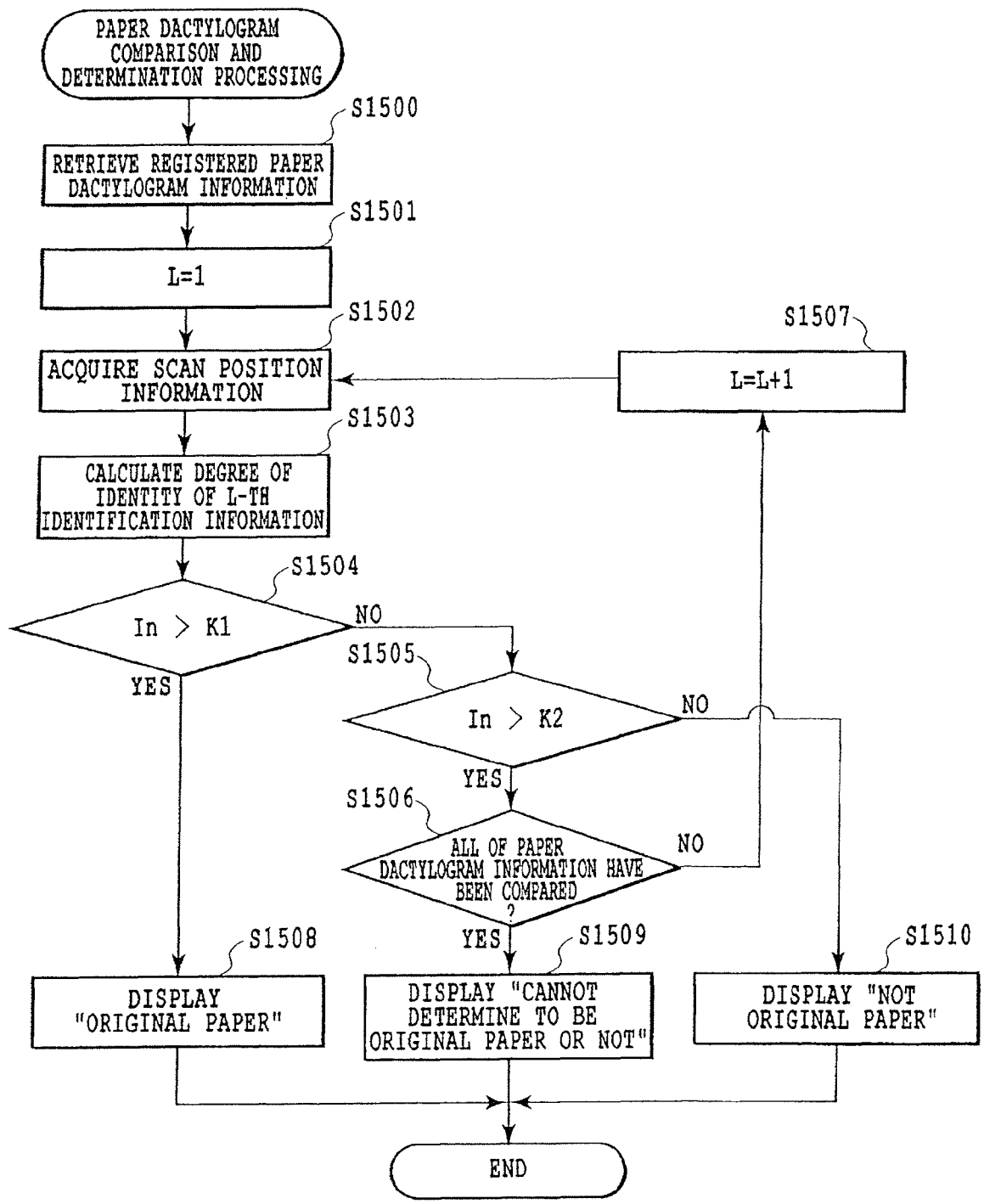
FIG. 15 is a flowchart showing paper dactylogram information comparison/determination processing according to the present invention.

FIG. 15 is a flowchart showing the paper dactylogram information comparison/determination processing (step S1403 in FIG. 14), wherein the number of paper dactylogram regions is five for example. Steps in this flowchart are controlled by the CPU 301 in a unified manner.

In the flowchart in FIG. 15, the degree of identity (the degree of similarity) of the both paper dactylograms is calculated. When the degree of identity (the degree of matching between L-th registered paper dactylogram information and L-th scanned paper dactylogram information) is proven to be very high, it is displayed that the scanned original manuscript is the original paper without incrementing L by one. That is, when the degree of identity is proven to be very high, it is displayed that the scanned original manuscript is the original paper without comparing paper dactylogram information of another region (in the next turn).

Also, when the degree of identity is proven to be very low, it is displayed that the scanned original manuscript is not the original paper without incrementing L by one. That is, when the degree of identity is proven to be very low, it is displayed that the scanned original manuscript is not the original paper without comparison paper dactylogram information of another region (in the next turn).

Otherwise, when the degree of identity is proven to be a normal degree (gray zone), it cannot be determined whether the scanned original manuscript is stained original paper or a counterfeit. Because of this, the determination of being the original paper or a counterfeit is committed to not the comparison to L-th paper dactylogram information, but comparison to (L+1)-th paper dactylogram information. In the flowchart, L is incremented by one (step 1507) for comparison to paper dactylogram information in the next turn. In this way, in this embodiment, depending on the degree of similarity between L-th registered paper dactylogram information and L-th scanned paper dactylogram information, it is decided to whether or not to compare paper dactylogram information of another region (in the next turn).

At step 1500, registered paper dactylogram information at five positions correspondingly to the scanned paper document (hereinafter, registered paper dactylogram information) is retrieved and stored in the RAM 302 or the HDD 304, for example. The description will proceed herein assuming that the data as shown in FIG. 12 has been acquired.

At step 1501, set: L=1.

Meanwhile, the gray-scale image data and the mask data generated at step 1402 are paper dactylogram information of the entire scanned original manuscript. The paper dactylogram information of the entire scanned original manuscript is referred to as entire scanned paper dactylogram information.

At step 1502, L-th scanned paper dactylogram information is retrieved from a region corresponding to (matching) an acquired position of L-th registered paper dactylogram information in the entire scanned paper dactylogram information.

At step 1503, the degree of identity between the L-th scanned paper dactylogram information and the L-th registered paper dactylogram information is calculated. A method of calculating the degree of identity will be described below.

At step 1504, it is determined whether or not the degree of identity (In) is larger than K1. If the degree of identity (In) is larger than K1, the flow proceeds to step 1508. Then, at step 1508, the display screen is controlled to display "Original Paper". Otherwise, if the degree of identity (In) is K1 or less, it is decided to proceed to step 1505.

At step 1505, it is determined whether or not the degree of identity (In) is larger than K2. If the degree of identity (In) is K2 or less, it is decided to proceed to step 1510. Then, at step 1510, the display screen is controlled to display "Not Original Paper". Otherwise, if the degree of identity (In) is larger than K2, it is decided to proceed to step 1506.

At step 1506, it is determined whether or not L=5. That is, it is determined whether or not all of paper dactylogram information has been already compared. If so, the flow proceeds to step 1509. At step 1509, the display screen is controlled to display "Cannot Determine to be Original Paper or Not". Otherwise, if not all of paper dactylogram information has been compared, the flow proceeds to step 1507 where L is incremented by one to control the processing to be applied to the next paper dactylogram information. That is, it is decided to make the paper dactylogram information in the next turn a target of the processing. Then, after the processing at step 1507, the flow returns to step 1502.

<Method of Calculating Degree of Identity at Step 1503>

$$E = \frac{\sum_{x=0,y=0}^{X,Y} \alpha_1()\alpha_2\{f_1(x,y) - f_2(x,y)\}^2}{\sum_{x=0,y=0}^{X,Y} \alpha_1(x,y)\alpha_2(x,y)} \quad \text{Formula (1)}$$

In the formula (1), $\alpha_1$ is mask data in L-th registered paper dactylogram information, $f_1$ is gray-scale image data in the L-th registered paper dactylogram information, $\alpha_2$ is mask data in L-th scanned paper dactylogram information, and $f_2$ is gray-scale image data in L-th registered paper dactylogram information.

In the formula (1), X and Y represent the maximum values that x and y in the pixel position (x, y) can take, respectively. In other words, it means that a paper dactylogram region consists of Y pixels by X pixels.

In the formula (1), $\alpha_1(x, y)=1$ means that a pixel at the pixel position (x, y) ((x, y) represents coordinates in a paper dactylogram region starting from 0) is bright. In other words, if an original manuscript was scanned in order to acquire registered paper dactylogram information, it indicates that the pixel at the pixel position (x, y) in the original manuscript has no color material (toner or ink) or dust.

In the formula (1), $\alpha_2(x, y)=1$ means that a pixel at the pixel position (x, y) is bright. In other words, if the original manuscript was scanned in order to acquire scanned paper dactylogram information, it indicates that the pixel at the pixel position (x, y) in the original manuscript has no color material (toner or ink) or dust.

If $\alpha_1(x, y)=1$ and $\alpha_2(x, y)=1$ hold for all pixels, i.e., if color material or dusts exist on manuscript when both of the paper dactylogram information is acquired, the formula (1) is identical to the following formula:

$$E = \sum_{x=0, y=0}^{X,Y} \{f_1(x, y) - f_2(x, y)\}^2 \quad \text{Formula (2)}$$

wherein X and Y represent the maximum values that x and y at the pixel position (x, y) can take, respectively. In other words, a paper dactylogram region consists of Y pixels by X pixels.

In the formula (2), $\{f_1(x, y) - f_2(x, y)\}^2$ represents the value of the squared difference between gray-scale image data in L-th registered paper dactylogram information and gray-scale image data in L-th scanned paper dactylogram information. Therefore, the formula (1) containing Σ represents the total of the squared difference between pixels in two pieces of paper dactylogram information. That is, if there are the more pixels in which $f_1(x, y)$ and $f_2(x, y)$ are similar to each other, the E takes smaller value.

Then, the degree of identity (In) is decided to be 1/E.

In this embodiment, the degree of identity is calculated without using gray-scale data of a dark pixel, but by using symbols such as $\alpha_1(x, y)$ or $\alpha_2(x, y)$.

The following describes the reason of not using gray-scale data at a dark pixel. A dark pixel has a color material or dust on it, information of fiber winding has been lost as the result. Because of this, if the degree of identity of paper dactylogram information is decided by using gray-scale data of a dark pixel, it means that the degree of identity ends depend on a value representing whether or not the pixel position of a pixel having dust or color material on it matches between those at scanning and registration. However, value we want to obtain at this time is the degree of identity between pieces of paper dactylogram information, but not the degree of identity between dust positions or pixel positions stained with color material.

Consequently, in this embodiment, symbols such as $\alpha_1(x, y)$ or $\alpha_2(x, y)$ are used so that gray-scale data of a dark pixel (a pixel possibly having color material or dust on it) is not used to calculate the degree of identity.

Other Embodiments

The present invention can be further applied to a system comprising a plurality of instruments (for example, a computer, interface equipment, a reader, a printer or the like), or applied to an apparatus comprising a single instrument (a multi-function copier, a printer, a facsimile apparatus or the like).

An object of the present invention is also achieved through reading out and executing the program code by a computer (or CPU or MPU) of the system or apparatus from storage medium storing a program code realizing the procedure of the above flowchart. In this case, the program code itself read out from the storage medium may realize functions of the above embodiments. As such, the program code and the storage medium storing the program code themselves also may configure part of the present invention.

The storage medium to supply the program code includes, for example, a floppy (R) disc, a hard disk, an optical disc, a magneto-optical disc, a CD-ROM, a CD-R, a magnetic tape, a non-volatile memory card, a ROM and the like.

A case is also assumed in which an OS (operating system) or the like running on the computer based on an indication in the program code executes part or all of the actual processing such that a processing to execute it realizes the functions of the above embodiments.

Another case is also similarly assumed in which the program code read out from the storage medium is written in a memory of a unit inserted to the computer, and then a CPU or the like in the unit based on an indication in the program code performs part or all of the actual processing. The processing realizes the functions of the above embodiments. The unit in that case can include a function expansion board or a function expansion unit connected to a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-240195, filed Sep. 5, 2006, Nos. 2006-336034, filed Dec. 13, 2006, which are hereby incorporated by reference herein in their entirety.

What is claimed is:

1. An image processing apparatus comprising:
a first unit for calculating a degree of similarity between image information of a first region on a scanned sheet and previously registered information of the first region on said sheet as image information; and
a second unit for calculating a degree of similarity between image information of a second region, wherein the second region is another region on the scanned sheet containing the first region, and previously registered information of the second region on the sheet as image information,
wherein the image processing apparatus,
if the calculated degree of similarity by the first unit is greater than a first threshold and less than a second threshold having a greater value than the first threshold, calculates said degree of similarity by the second unit;
if the calculated degree of similarity by the first unit is less than or equal to the first threshold, controls to terminate the process for calculating said degree of similarity to display an indication that the scanned sheet is not an original paper; and
if the calculated degree of similarity by the first unit is greater than or equal to the second threshold, controls to terminate the process for calculating said degree of similarity to display an indication that the scanned sheet is an original paper,
wherein the first unit and the second unit ignore dark regions in the image information of the scanned sheet and dark regions in the previously registered information of said sheet as image information when the degree of similarity is calculated, and
wherein if f1(x,y) represents the image information of a first region on a scanned sheet and α1(x,y) represents the dark region in the image information of the first region, and
f2(x,y) represents previously registered information of the first region on said sheet as image information and α2(x, y) represents the dark region in the previously registered information of the first region, then,
the degree of similarity calculated by the first unit is indicated as $$\frac{\sum \alpha 1(x, y) \alpha 2(x, y) \{f1(x, y) - f2(x, y)\}^2}{\sum \alpha 1(x, y) \alpha 2(x, y)}.$$

2. A control method of an image processing apparatus having a first unit for calculating a degree of similarity between image information of a first region on a scanned sheet and previously registered information of the first region on said sheet as image information, and a second unit for calculating a degree of similarity between image information of a second region, wherein the second region is another region on the scanned sheet containing the first region, and previously registered information of the second region on the sheet as image information, the control method comprising:

- if the calculated degree of similarity by the first unit is greater than a first threshold and less than a second threshold having a greater value than the first threshold, calculating said degree of similarity by the second unit;
- if the calculated degree of similarity by the first unit is less than or equal to the first threshold, controlling to terminate the process for calculating said degree of similarity to display an indication that the scanned sheet is not an original paper; and
- if the calculated degree of similarity by the first unit is greater than or equal to the second threshold, controlling to terminate the process for calculating said degree of similarity to display an indication that the scanned sheet is an original paper, and wherein the first unit and the second unit ignore dark regions in the image information of the scanned sheet and dark regions in the previously registered information of said sheet as image information when the degree of similarity is calculated, and wherein if f1(x,y) represents the image information of a first region on a scanned sheet and α1(x,y) represents the dark region in the image information of the first region, and f2(x,y) represents previously registered information of the first region on said sheet as image information and α2(x,y) represents the dark region in the previously registered information of the first region, then, the degree of similarity calculated by the first unit is indicated as $$\frac{\sum \alpha 1(x, y) \alpha 2(x, y) \{f1(x, y) - f2(x, y)\}^2}{\sum \alpha 1(x, y) \alpha 2(x, y)}.$$

3. A program on a non-transitory computer-readable storage medium which causes a computer to execute the control method set forth in claim 2.

* * * * *